Feb. 23, 1932.     G. SUNDBACK     1,846,920
SEPARABLE FASTENER LOCKING MEMBER
Filed July 11, 1929
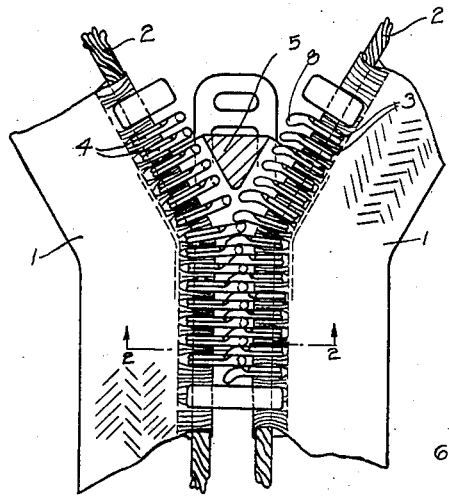
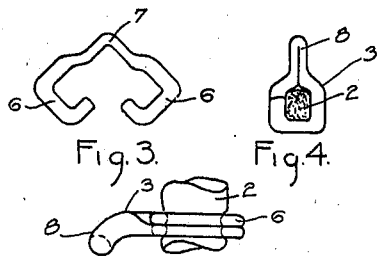
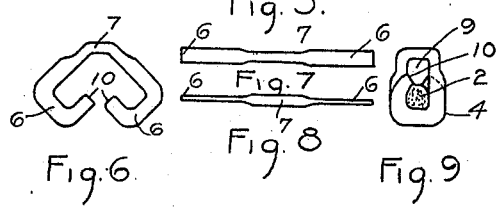
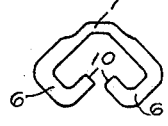
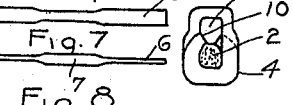
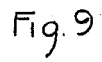
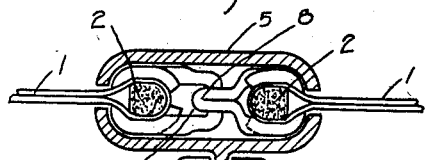
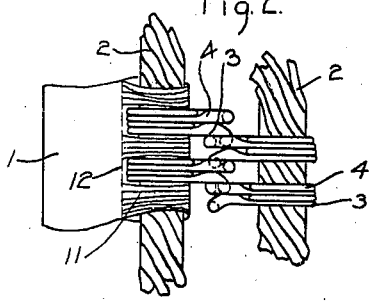
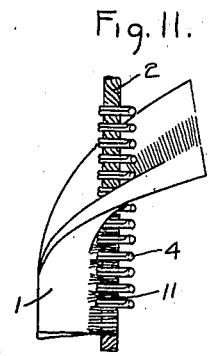
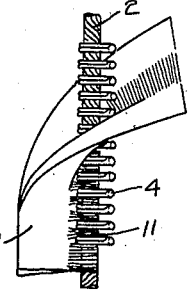
INVENTOR.
Gideon Sundback
BY
ATTORNEY.

Patented Feb. 23, 1932

1,846,920

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

SEPARABLE FASTENER LOCKING MEMBER

Original application filed August 2, 1926, Serial No. 126,539. Divided and this application filed July 11, 1929. Serial No. 377,361.

This invention relates to separable fastener locking members of the type disclosed in my copending application Serial No. 126,539, filed August 2, 1926, of which this application is a division, and is directed principally to improvements upon the bent wire locking members disclosed in my copending application Serial No. 735,574, filed September 3, 1924, of which this application is a continuation in part.

The object of the invention is to increase the strength and holding power of bent wire locking members, to reduce their weight and bulk, and to construct such members of less metal and in fewer forming operations than heretofore, with substantial savings in cost.

The locking members disclosed in my application Serial No. 735,574, filed September 3, 1924, are made of ordinary wire of round or other cross-section cut off to the desired length bent to U-shape, deformed at the bend to provide locking surfaces, and having the legs formed to clamp the members on the corded stringer. These locking members are uniformly strong and durable in use, are lighter than previous locking members of equal strength, and are cheaper to produce because they require fewer forming operations and leave less waste than heretofore. For certain uses, however, bent wire locking members of uniform cross-section have insufficient material to supply the desired stiffness to hold upon the stringer, and insufficient material at the bend to permit locking surfaces of the desired configuration to be formed from the material available. This is particularly true in the case of fasteners applied to women's apparel where the tendency to light weight is pronounced. If such locking members are made strong enough to withstand continued hard usage their weight becomes objectionable and can be reduced only by impairing strength and holding power.

The present invention provides a special construction of wire locking members, some of which are bent to provide hook-like projections and others of which are bent to provide recesses, all being formed by die operations from straight wire, ready for compression upon the tape. The ends of both the projection and recess members are reduced and are adapted to be bent or wrapped around the corded edge of the tape. This construction gives the members increased strength and holding power while reducing their size and weight and consequently reducing the overall weight of the fastener to which they are applied.

The invention will be described in connection with the accompanying drawings, in which:

Fig. 1 shows one embodiment of my invention in a partially closed fastener;

Fig. 2 is a section taken on the line 2—2 of Fig. 1;

Fig. 3 shows the projection member of Fig. 1 after being partially formed;

Fig. 4 shows the finished projection member clamped upon a cord;

Fig. 5 is a side view of Fig. 4;

Fig. 6 shows the recess member of Fig. 1 partially formed;

Fig. 7 shows the wire blank from which either member is made;

Fig. 8 is a top plan view of the blank shown in Fig. 7;

Fig. 9 shows the finished recess member clamped upon a cord;

Fig. 10 shows cooperating locking members of the form shown in Fig. 1, but arranged in a different manner on the stringers; and Fig. 11 shows a preferred way of attaching the locking members to the stringers.

In Fig. 1, the stringers 1, which may be of woven tape, have twisted or braided cords 2 enclosed in the fold thereof. A plurality of locking members 3 and 4 are mounted in staggered relation on the edges of the opposite stringers and are adapted to be engaged and disengaged by the up and down movement of the slider 5, which may be of any suitable construction.

The locking members 3 on the right-hand stringer are provided with hook-like projections, while the locking members 4 on the left-hand stringer are provided with recesses which receive and retain said projections when the fastener is closed. These locking members are both formed from the straight wire blanks shown in Figs. 7 and 8.

The wire blanks, preferably round in cross-section, are cut to the desired length and are then rolled or formed between dies which flatten and reduce the end portions 6 to about half the thickness of the central portion 7. So far, the formation is the same for both the projection and recess members.

To complete the projection member 3, the reduced end portions 6 are bent inwardly in opposite directions, each with two substantially 90° bends, as shown in Fig. 3, to form compressible clamping jaws which are adapted to be wrapped around the corded edge of the stringer. The central thickened portion 7 is bent double so that the adjacent portions on opposite sides of the bend lie close together, as shown in Fig. 4, and the doubled metal is then bent over to form a curved hook-like projection 8, as shown in Fig. 5.

The jaws 6 are wrapped securely around the cord 2, compressing the cord and creating a slight bulge above and below the jaws, as shown in Fig. 5, which effectively prevents the member from slipping. Since the jaws 6 are about half the thickness of the projection 8 they do not increase the dimension of the locking member longitudinally of the stringer and do not diminish the flexibility of the stringer.

To complete the recess member 4, the central thickened portion 7 is bent to U-shape, thereby forming a recess 9, and the reduced end portions 6 are bent inwardly to form clamping jaws similar to those of the projection member. In attaching the recess member to the stringer the clamping jaws are wrapped around the cord 2 to overlapping position, as shown in Fig. 9, with the free ends 10 bent in against the cord to prevent it from bulging into the recess 9.

Fig. 10 illustrates a modified arrangement of the locking members 3 and 4 upon the stringers, the recess and projecting members being secured contiguous one another on the same stringer with suitable spacing between the pairs of members so that engagement will be effected in the manner illustrated. In Fig. 10 flexing of the fastener takes place between the pairs of locking members and not between the contiguous locking members of each pair.

Fig. 11 illustrates the preferred manner of attaching the locking members to the tape. In this construction the locking members are first clamped upon the cord 2, as previously described. The stringer preferably consists of woven tape folded over, with certain warp threads pulled out or omitted at the fold, leaving only the weft threads 11. The locking members, previously mounted on the cord 2, are then pushed through the weft threads 11 so that they project out of the fabric. The tape is then folded over and the plies stitched together at 12 to form a strong unitary stringer with the parts locked firmly in place.

Among the advantages of this invention may be enumerated the increased strength and holding power resulting from having the blank thickened at the place where it is to be bent. Another result from the same structure is increased stiffness and resistance to spreading which aids in holding the members on the tape. The straight wire blank is cheaper than specially formed blanks generally employed in the art, and does not require annealing or special care in handling. Having the jaws overlap increases the holding power on the tape and lessens any possibility of the jaws spreading under crosswise stress on the material. By flattening the clamping jaws increased holding power is obtained without increasing the dimensions of the jaws on the tape or impairing the flexibility of the fastener. Reducing the thickness of the jaws longitudinally of the tape also lessens their tendency to spread and increases their stiffness.

I claim:

1. A separable fastener locking member comprising a strip of material having a central thickened portion bent upon itself with the portions adjacent the bend lying close together and bent to form a hook, said member having end portions bent to overlap each other within a space no greater than that occupied by said hook.

2. A separable fastener locking member comprising a strip of material bent upon itself in the middle with the portions adjacent the bend lying close together and bent to form a hook, said member having end portions reduced in cross-section and bent at right angles to form overlapping clamping jaws.

3. A separable fastener locking member comprising a strip of material which is bent upon itself to form a central section of relatively heavy cross-section forming the interlocking portion, and attaching portions extending from said interlocking portion, said attaching portions being transversely flattened and extended into overlapping relation, whereby the combined thickness of the overlapping portions is no greater than the thickness of the interlocking portion.

4. A separable fastener comprising a pair of stringers of flexible material, locking members attached to and projecting from the edges of said stringers, certain of said locking members each comprising a strip of material having its ends bent around the edge of one of the stringers, the opposite portions adjacent said bend being bent close together and bodily bent longitudinally of the stringer to form a relatively narrow hook, and other locking members providing loops in which the said hook members may be received when the fastener is locked.

5. A separable fastener comprising a pair of stringers of flexible material, a series of loop locking members attached to and having loops projecting from the edges of each of the stringers, and other locking members between said loop members on each stringer having hook-like projections interlocking with a loop of the adjacent member on the opposite stringer.

Signed at Meadville, in the county of Crawford and State of Pennsylvania, this 19th day of June, A. D. 1929.

GIDEON SUNDBACK.